United States Patent [19]

Saiki et al.

[11] 4,417,697
[45] Nov. 29, 1983

[54] CRUSHING/DISCHARGING DEVICE FOR MATERIALS BEING DRIED IN A MULTISTAGE TYPE VACUUM DRYING APPARATUS

[75] Inventors: Yukihiro Saiki, Saitama; Eitaro Kumazawa, Sayama; Yozo Ishioka, Higashikurume, all of Japan

[73] Assignee: Snow Brand Milk Products Co., Ltd., Sapporo, Japan

[21] Appl. No.: 306,912

[22] PCT Filed: Mar. 25, 1981

[86] PCT No.: PCT/JP81/00063
  § 371 Date: Sep. 21, 1981
  § 102(e) Date: Sep. 21, 1981

[87] PCT Pub. No.: WO81/02689
  PCT Pub. Date: Oct. 1, 1981

[30] Foreign Application Priority Data

Mar. 25, 1980 [JP] Japan .................. 55-37891

[51] Int. Cl.³ .............................................. B02C 18/06
[52] U.S. Cl. .................................... 241/65; 241/223; 241/243
[58] Field of Search .............. 241/23, 65, 243, 222, 241/223, 246, 247, 186 A, 100

[56] References Cited

U.S. PATENT DOCUMENTS 662,350 11/1900 Bussels .............................. 241/243
3,762,256 10/1973 Frantz .......................... 241/243 X

FOREIGN PATENT DOCUMENTS 54-129558 8/1979 Japan .

Primary Examiner—Mark Rosenbaum
Attorney, Agent, or Firm—Flynn, Thiel, Boutell & Tanis

[57] ABSTRACT

An apparatus is disclosed wherein a highly viscous, heat-sensitive material such as concentrated whole milk or concentrated fruit juice is supplied onto a plural-stage belt conveyor stretched within a vacuum chamber and is dried and solidified by means of a heating member while moving along the belt conveyor. The resulting dried material is received by a fixed cutter provided within a casing disposed at the turning point where the belt conveyor is to turn to the return stroke side. This dried material is then crushed by a crushing device equipped with said fixed cutter and a rotary cutter cooperating therewith, and the thus crushed material is let fall within the casing and discharged to the outside of the vacuum chamber by means of a discharging device equipped with a screw wing installed in the lower part of the casing.

14 Claims, 8 Drawing Figures

CRUSHING/DISCHARGING DEVICE FOR MATERIALS BEING DRIED IN A MULTISTAGE TYPE VACUUM DRYING APPARATUS

TECHNICAL FIELD

The present invention relates to a device for the purpose of crushing and taking out dried products of a highly viscous, heat-sensitive material such as concentrated whole milk, concentrated fruit juice, etc. supplied onto a plural-stage belt conveyer arranged in a vacuum chamber, after said material has been dried and solidified by means of a heating member while being moved along by said moving belt conveyer.

BACKGROUND ART

Such devices as mentioned above have hitherto been known, and as an instance thereof, there can be cited a device disclosed previously by the applicant of the present invention in Japanese Patent application No. 37699/1978 (Laid-open Application No. 129558/1979) hereinafter referred to as the previous invention. To begin with, said previous invention will be explained with reference to FIGS. 1 through 3 of the appended drawings.

Among the reference numerals in these drawings, 1 denotes a vacuum chamber, which is provided with an exhaust port 2 disposed on the top and a discharge port 3 for taking out the crushed dried product disposed on the bottom. Upper and lower belt conveyers 6 for conveying the material being dried are arranged in multistage fashion and each belt is stretched between a driving roll 4 and a guide roll 5 to move in the direction of the arrow. The return stroke side of each belt is disposed spaced from the feed stroke side. This belt 6 is desirably made of glass cloth coated with polytetrafluoroethylene and subjected to surface treatment for electrostatic charge prevention. Heaters 7 are disposed below the lower face of each belt 6 and above the upper face of the uppermost belt 6 by leaving spaces between the belts. Above the uppermost heater 7 and under the lowermost heater 7 there are disposed reflectors 8 respectively. On the upper face of each belt 6, there is provided a feed nozzle 9 for the material to be dried disposed ahead of the heater 7 along the direction of movement of the belt. To the rear of the heater 7 there are provided a crushing roll 10 disposed to correspond to a belt supporting base 11 installed on the lower face of each belt 6 and an angle scraper 12 for the purpose of scraping the crushed, dried material from the surface of the belt 6 and removing it to both sides of said belt. On both sides of each belt 6 there is provided a guide plate 13 respectively in armor-sleeve fashion in order to prevent the crushed, dried material from attaching to the lower face of the belt 6.

In addition to the above described previous invention, there is known another device such as shown in FIG. 4 which has also been developed by the present inventors. This invention is, so to speak, a modification of the previous invention, wherein a different crushing/discharging device is installed instead of the crushing roll 10, belt supporting base 11, scraper 12 and discharge port 3 of the device of the previous invention. (This modification is hereinafter referred to as the 'previous proposition'.) Details of this invention will be explained in the following.

In this crushing/discharging device, a rotary cutter 10' is disposed above the driving roll 4 for the belt 6, and this cutter 10' is always being pulled in the direction of the driving roll 4 by means of a spring 14 in order to crush a matlike dried material moving along the belt 6 as it rotates.

The dried material crushed in this way is scraped off by a scraper 12' installed to the rear of the cutter 10', collected by a ductlike chute 13' and allowed to fall down.

The dried material thus fallen is collected into a collecting hopper 16 disposed at the lower opening of the chamber 1. In this hopper 16 there is provided a rotary cutter 19 having a perforated metal retainer 18 around it which is driven by an air motor 17. The dried material thus collected into the hopper 16 is crushed by the rotary cutter 19 and, after having been regulated in grain size by passing through the perforated metal retainer 18, is taken out of the apparatus.

In the case of such a crushing device, however, when the matlike dried material 15 is too thick, said dried material 15 may pass over the cutter 10', and when the hardness of the material is too high, the material may lift the cutter 10', whereby the device may fail to fulfil its function of crushing. Therefore, in order to avoid such troubles, it is necessary to enhance the diameter of the cutter 10', increase the strength of the spring 14, and so on.

Moreover, in the case of this device, inasmuch as the crushing is to be carried out on the belt 6, there occurs a phenomenon of return of fine particles, resulting in the mixing of scorched particles in the final product. And, in fact, it is impossible to remove effectively fine particles having a diameter of less than $30\mu$ by means of the scraper 12'. The reason is that is is difficult to improve the precision of working of the scraper 12' to the extent of enabling it to perform such removal, and the same goes with respect to the precision of finishing of the surface of the belt 6.

Further, in the case of this device, when the dried material 15 is hard, there is a fear of impairing the surface of the belt 6 at the time of crushing the material coarsely, and as the angle of inclination $\alpha$ of the chute 13' to collect the crushed, dried material is determined by the ratio H/L of the width L of the belt 6 to the height H of the driving roll 4 relative to the returning belt 6, the lower a belt 6 is disposed, the smaller becomes the angle of inclination $\alpha$, resulting in lowering of efficiency in conveying the crushed material. Therefore, the height H of the driving roll 4 relative to the lowermost returning belt 6 is naturally limited. Accordingly, in order to enhance the conveying efficiency in conformity with an increase in the number of stages, provision of a bulky vacuum chamber with large size on the side of the product discharge port is required. As a countermeasure, it is conceivable to install a vibrator or the like on each stage of the chute 13, but provision of an electric motor within the vacuum chamber makes it difficult to radiate heat generated by the motor and damages the apparatus, so it is common not to take such a measure.

Compared with this device illustrated in FIG. 4, the previous invention is superior in several points but is the same with the former in so far as it is devised to perform the work of coarsely crushing and scraping on the surface of the belt 6 and is incapable of checking the occurrence of the phenomenon of return of fine particles. Besides, this method would cause fine particles to float within the vacuum chamber 1 and attach to the back of the belt 6, the belt supporting roll, etc., causing meandering of the belt 6. Further, disposition of many guide plates 13 along both sides of the belt 6 requires the provision of an unexpectedly large capacity of the vacuum chamber 1 on the side of the discharge port for the crushed dried material. Accordingly, the present invention is intended to provide a device that can make up for the defects inherent in the fore going previous devices by improving them on the basis of the following conceptions in order to produce dried products of good quality stably and continuously:

(1) Dried materials that have attained a prescribed moisture are to be scraped, coarsely crushed, conveyed and thereafter discharged to the outside of the vacuum system through the popular processes of collection of powder, regulation of grain size and discharge of product.
(2) The works steps of coarsely crushing and scraping are not to be carried out on the surface of the belt.
(3) The dried materials scraped from the surface of belt and crushed are to be conveyed and collected without fail and should not cause floating of fine particles and the like.
(4) The space for installing the device is to be minimized so as to facilitate maintenance and control thereof, including washing.

DISCLOSURE OF INVENTION

The present invention is intended to provide a multistage type continuous vacuum drying apparatus consisting of a vacuum chamber accommodating a plural-stage belt conveyer and a heating member, wherein there is installed a casing adjacent to the belt at the turning point where said belt conveyer turns to the return stroke side, and in the upper part of this casing there are provided a fixed cutter or grate that receives the dried material from the belt and a crushing device equipped with a rotary cutter or crusher that crushes the dried material in cooperation with said fixed cutter, while in the lower part of the casing there is provided a discharge device equipped with a screw flight that receives the dried material crushed by the crushing device and discharges it to the outside of the apparatus. Therefore, according to the present invention, inasmuch as the dried material is supposed to be taken out of the belt conveyer and crushed by the crushing device equipped with a fixed cutter and a rotary cutter, and a matlike dried material neither passes over the rotary cutter even when the material swells and increases in thickness nor lifts the rotary cutter even when its hardness gets high, the crushing work can be performed precisely, the surface of belt is not impaired at the time of crushing, and occurrence of undesirable phenomena, i.e., return of fine particles on the surface of belt, floating of fine particles within the vacuum chamber, attachment of fine particles onto the back of the belt and the belt supporting roll, etc. can be prevented. Further, according to the present invention, inasmuch as a discharge device equipped wit a screw flight for discharging the crushed material to the outside is installed within the casing together with the crushing device, the entirety of the crushing and discharging device is compact, whereby the size of the vacuum chamber can be minimized.

Further, according to the present invention, inasmuch as the casing is detachably installed on the frame within the vacuum chamber and the screw flight is detachably installed on the casing, at the time of washing the crushing device and/or the discharge device after operation, the work of taking out the casing from the vacuum chamber and the screw flight from the casing can be facilitated.

Still further, according to the present invention, inasmuch as the crushing device is equipped with a fixed cutter having teeth that look like the teeth of a comb and the rotary cutter is equipped with cutting pins designed to pass through the interstices of said teeth, the dried material can be crushed with certainty and the thus crushed material can fall through the interstices of the teeth without scattering to other directions.

Moreover, according to the present invention, inasmuch as the angle of inclination of the cutting pins of the rotary cutter in the crushing device is equal to the angle of inclination of the screw flight in the discharge device, the pitch of the cutting pins of the same phase is equal to the pitch of the corresponding screw wing, and another cutting pin disposed adjacent to this pin is displaced by $\frac{1}{4}$ pitch, the crushing force against the matlike dried material can be lessened. Also, it becomes possible to effect overlapping of the cutting pins and screw flight, thereby facilitating smooth discharge operation of the screw wing.

BEST MODE OF CARRYING OUT THE INVENTION

Figure 1:
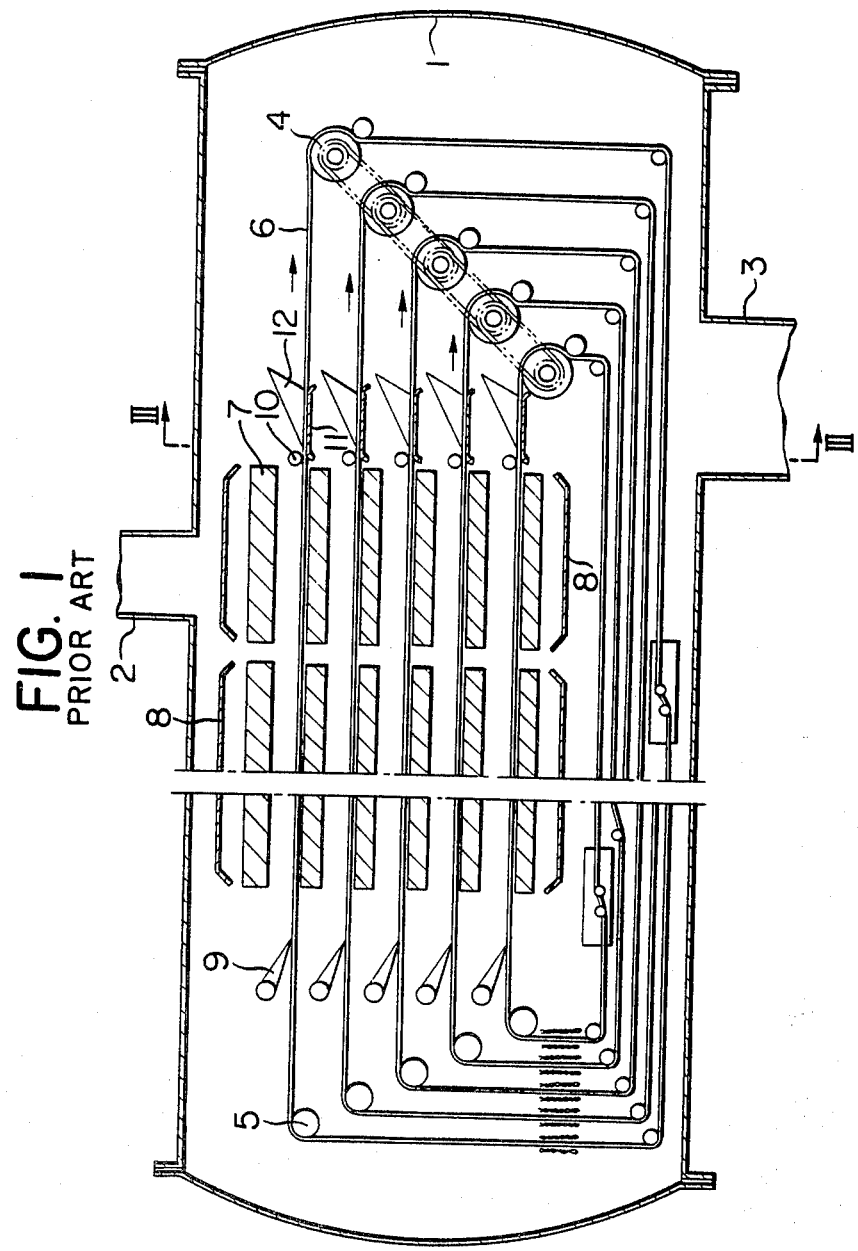
FIG. 1 is a front longitudinal sectional view, partly broken away, of a multistage type continuous vacuum drying apparatus according to the first previous invention.
Figure 2:
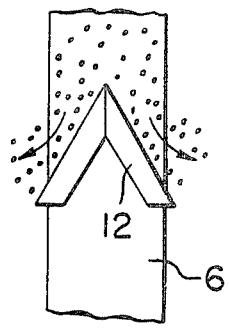
FIG. 2 is a top view of the scraper member of the apparatus shown in FIG. 1.
Figure 3:
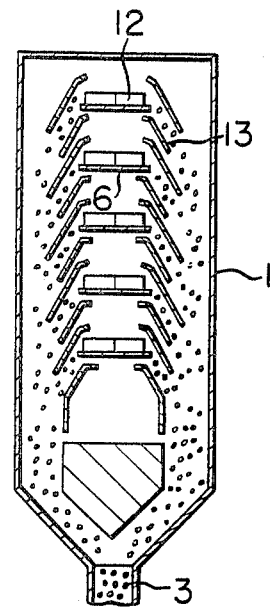
FIG. 3 is a sectional view taken along the line III—III in FIG. 1.
Figure 4:
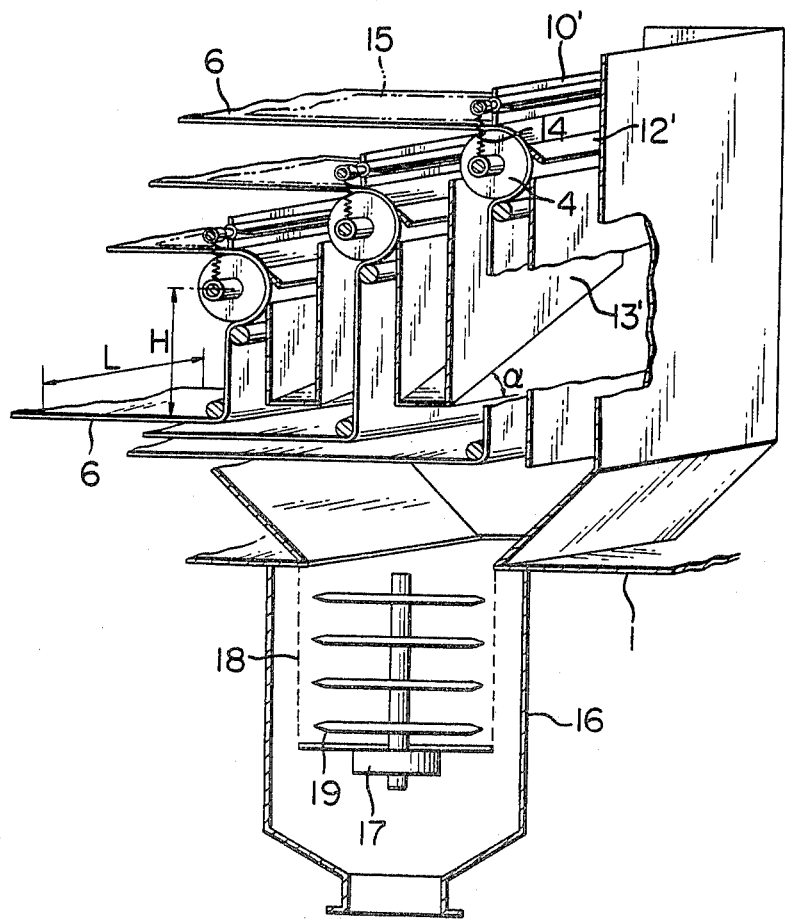
FIG. 4 is a perspective view, partly broken away, of the crushing/discharging device in a multistage type continuous vacuum drying apparatus according to the second previous proposal.
Figure 5:
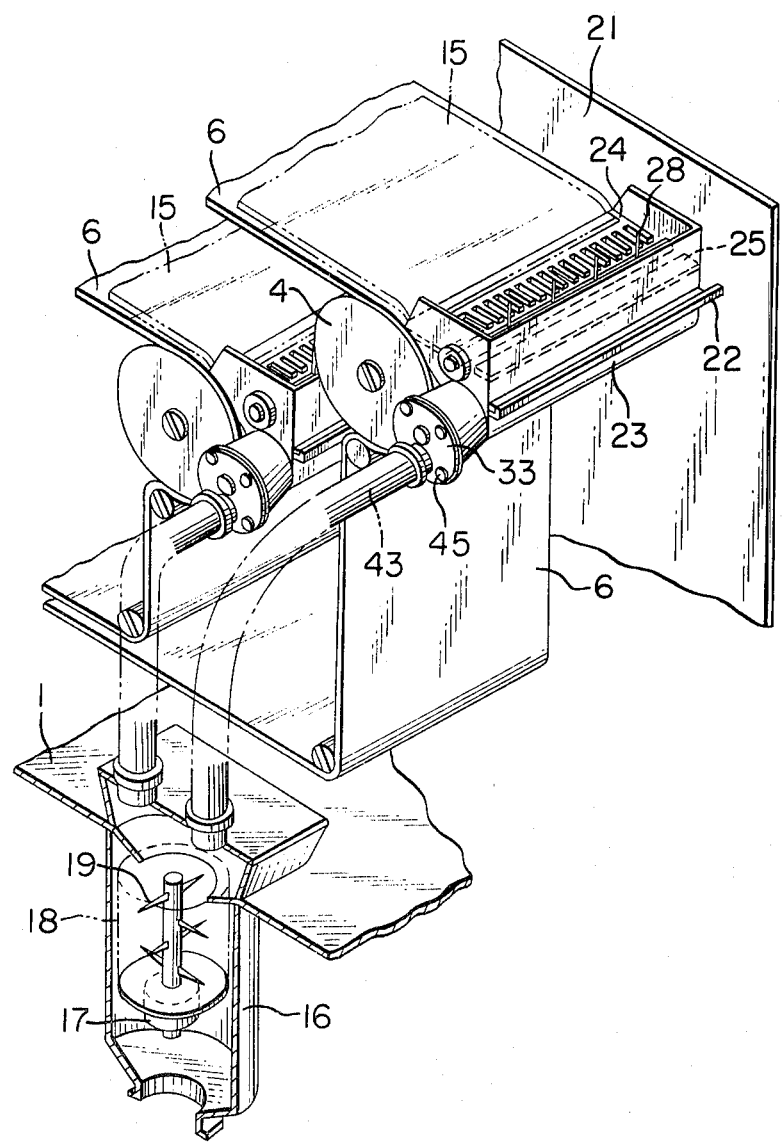
FIG. 5 is a view similar to FIG. 4, illustrating the crushing/discharging device in a multistage type continuous vacuum drying apparatus according to the present invention.

Hereunder will be explained the present invention with reference to an embodiment thereof shown in FIGS. 5 through 8.

In this embodiment, since parts other than the crushing/discharging device are similar to those described in the foregoing previous invention and previous proposition, explanation thereof is drastically abridged, and the parts adopted herein are expressed by quoting the same symbols as employed in the foregoing descriptions.

At the turning point where the belt 6 is to turn to the return stroke side, a pair of brackets 22, 22 (FIG. 7) are horizontally disposed adjacent to the roll 4 and supported on the frame 21. In a stair-shaped groove provided on the upper face of each bracket 22, there is fitted a tab portion 46 of the casing 23 in detachable fashion.

Figure 6:
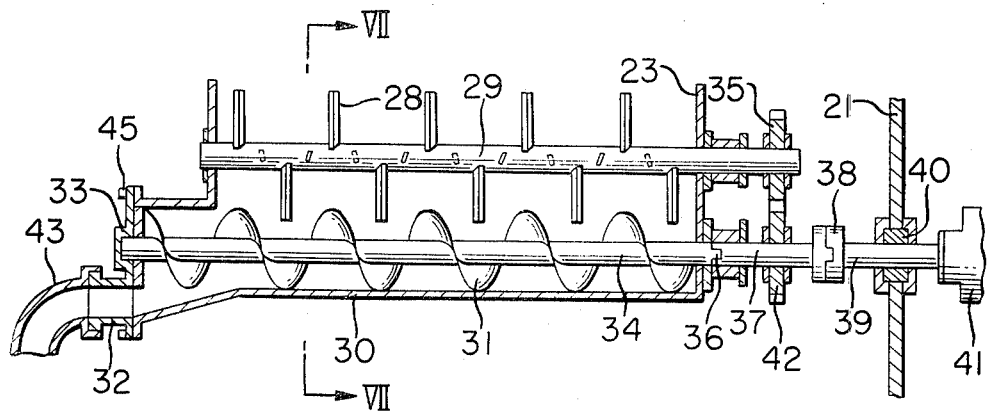
FIG. 6 is a longitudinal sectional view of an essential part of the apparatus shown in FIG. 5.
Figure 7:
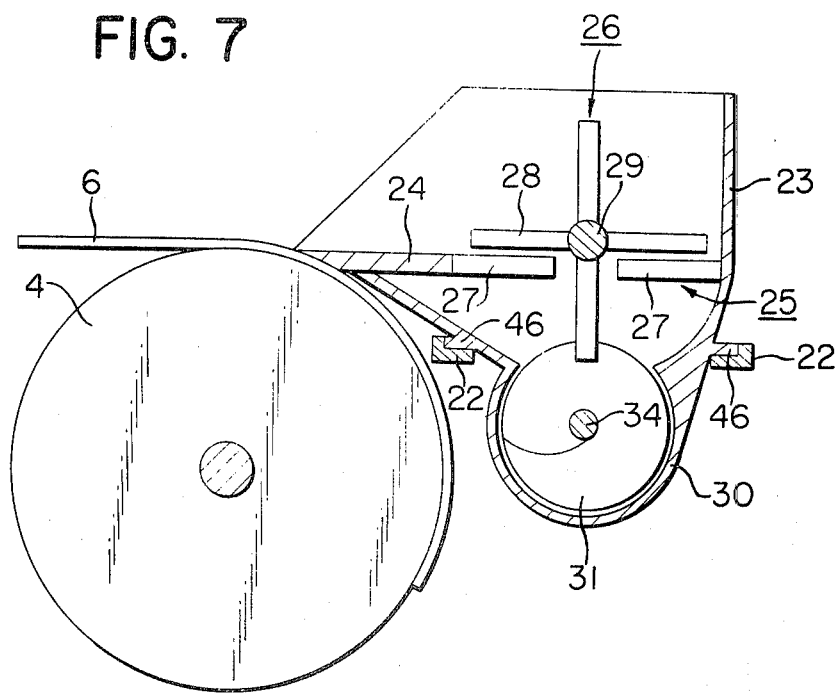
FIG. 7 is an enlarged sectional view of the same part as shown in FIG. 6 taken along the line VII—VII and taken in the direction of the arrows.

This casing 23 is so designed that its front and top are open while its other sides are closed by wall members. The open front portion is provided with a plate-shaped front fixed grate or cutter 24 whose fore edge contacts the surface of the belt 6 and is disposed on a level that is practically the same as that of the top face of the belt 6. The rear wall of the casing 23 is provided with a rear fixed grate or cutter 25 projecting from the rear wall, which cutter 25 is disposed on the same level as the foregoing fixed cutter 24 and is spaced therefrom. In the space between the cutter 24 and cutter 25 there is disposed a rotary cutter 26. The cutters 24 and 25 are both provided with teeth 27 shaped like the teeth of a comb which are disposed on the side facing the rotary cutter 26, and the rotary cutter 26 is equipped with a transverse rotary shaft 29. This rotary shaft 29 is provided with radially fixed plural cutting pins 28 which pass through the interstices of the teeth 27. One end of the rotary shaft 29 penetrates the side wall of the casing 23 to extend to the outside of the side wall, and its extremity is provided with a gear 35 (FIG. 6).

In the lower part of the casing 23, there is formed a transverse cylindrical hopper 30, and within this hopper 30 there is disposed a screw feeder 31. On the end of the opening of the hopper 30, there is detachably fixed a cover 33 provided with a discharge port 32 by means of setscrews 45. One end of the screw shaft 34 is supported on the cover 33, while the other end thereof penetrates the side wall of the casing 23 to extend to the outside thereof, and its extremity is coupled with one end of a counter shaft 37 by means of an Oldham's coupling 36. The other end of this counter shaft 37 is coupled with a drive shaft 39 by means of another Oldham's coupling 38. This drive shaft 39 is supported on the frame 21 by means of a sealing member 40, and is driven by a variable speed motor 41. On the counter shaft 37 there is mounted a gear 42 to engage with the aforesaid gear 35.

To the discharge port 32 of the cover 33 is fixed one end of a flexible tube 43, and the other end of this tube 43 is connected to a hopper 16.

Figure 8:
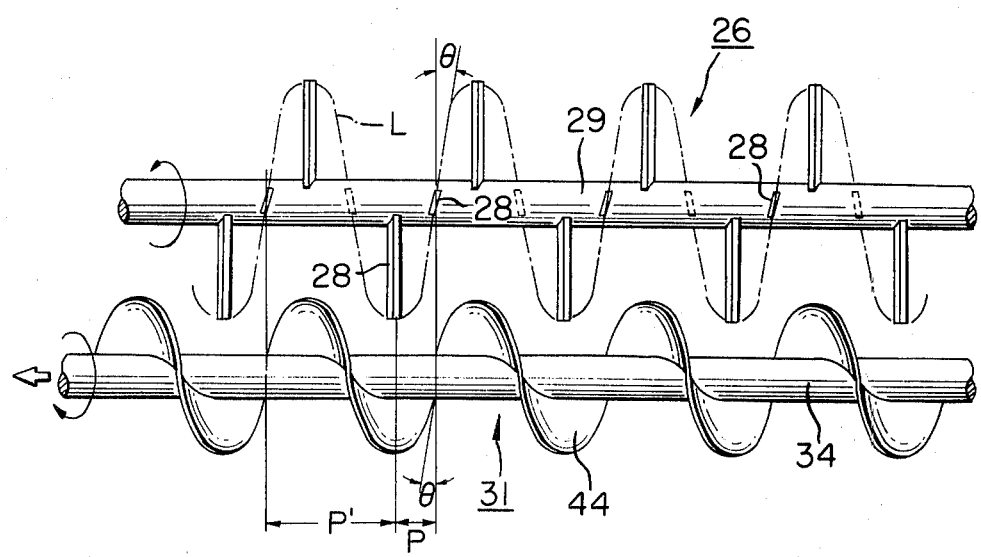
FIG. 8 is an enlarged view of the essential part of the same apparatus as shown in FIG. 6.

FIG. 8 illustrates the positional relation between the cutting pins 28 of the rotary cutter 26 and the screw flight 44 of the screw feeder 31. That is, the angle of inclination $\theta$ of the cutting pin 28 is equal to the angle of inclination $\theta$ of the screw flight 44, the pitch P between adjoining cutting pins 28 is $\frac{1}{4}$ of the pitch P' of the screw flight 44, and plural cutting pins 28 are radially installed on the rotary shaft 29 in order that a spiral locus L defined by the tips of the cutting pins 28 and the spiral of the edge of the screw flight 44 come to be similar in shape. By this means, the crushing force against the mat of dried material can be lessened, and even when there occurs overlapping of the cutting pins 28 and the screw flight 44, it is possible to conduct smooth rotation.

Next, the mode of operation of the afore described apparatus will be discussed in the following.

The dried material 15, having been conveyed along the belt 6, is scraped off the belt 6 by means of the fixed cutter 24 whose edge slidably contacts with the belt 6 when the belt attains the turning point on the roll 4 to shift to the return stroke side. The dried material 15 moves on along the fixed cutter 24, is crushed by means of the teeth 27 and the cutting pins 28 of the rotary cutter 26, and then falls throug the interstices of the teeth 27 and the space between the fixed cutters 24, 25. Some of the crushed material that attached to the cutting pins 28 at the time of this crushing work is scraped off when the cutting pins move through the interstices of the teeth 27 of the fixed cutter 25.

The thus fallen crushed material is pushed toward the discharge port 32 by means of the screw flight 44 within the hopper 30 and, after coming out through the discharge port 32, is sent into the collecting hopper 16 by way of a flexible tube 43.

At the time of the foregoing pushing by the screw flight 44, the cutting pins 28 are rotating above the screw feeder 31 within the casing 23, so occurrence of the phenomenon of bridging due to the crushed material in this portion can be prevented and supply of the crushed material to the screw feeder 31 is performed smoothly. Moreover, since the tips of the cutting pins 28 and the upper part of the screw flight 44 overlap each other, there occurs a phenomenon that the crushed material within the screw feeder 31 is cut by the cutting pins 28 and stagnation of the crushed material within the screw feeder 31 is prevented, whereby movement of the crushed material within the casing 23 and the hopper 30 can be performed very smoothly as a whole.

In the case where anything abnormal is observed in respect of the crushing device and discharge device, the tube 43 is detached from the discharge port 32, the coupling 38 is removed and the casing 23 is dismounted from the frame 21. Further, in order to take out the screw feeder 31 from the casing 23, the setscrews 45 are removed to detach the cover 33 from the casing 23, whereby the screw feeder 31 can be taken out through the opening formed thereby on the end of the casing.

Inasmuch as the present invention is so designed as described above, it is best suited for use as a multistage type continuous vacuum drying apparatus at the time of manufacturing powdered milk or powdered fruit juice, not to mention utilization thereof in other fields of industry.

We claim:

1. A vacuum drying apparatus, comprising:
an enclosure having an internal vacuum chamber;
an endless conveyor belt disposed within said vacuum chamber, said conveyor belt having a substantially horizontal upper reach, said upper reach having a feed end and a discharge end, said conveyor belt having a lower return reach and return portions respectively connecting the opposite ends of said lower return reach to the feed end and discharge end of said upper reach;
supply means for feeding the material to be dried onto the upper surface of said upper reach of said conveyor belt near to the feed end thereof so that the material moves with said upper reach of said conveyor belt to the discharge end thereof;
heating means associated with said upper reach of said conveyor belt for heating the material to assist in drying the material;
a casing mounted adjacent to the discharge end of said upper reach;
a crushing device disposed within said casing, said crushing device comprising a first, fixed, cutter blade extending longitudinally away from said discharge end of said upper reach and adapted for peeling off the material from said upper reach and directing it into said casing, said cutter blade having a multiplicity of transversely spaced-apart teeth on the end thereof remote from said discharge end of said upper reach of said conveyor belt, said crushing device also comprising a rotary cutter mounted for rotation about a substantially horizontal axis extending transversely to said upper reach of said conveyor belt, said rotary cutter comprising a multiplicity of substantially radially extending, axially spaced-apart cutting pins which are interdigitated with said teeth so that rotation of said rotary cutter crushes the material by moving said cutting pins through the interstices between said teeth;

a screw conveyor disposed within said casing below said fixed cutter blade and said rotary cutter and adapted for receiving the crushed material, said screw conveyor being rotatable about a substantially horizontal axis that extends transversely to said upper reach of said conveyor belt, said screw conveyor having a helical screw flight for moving the crushed material in a direction transverse to said upper reach of said conveyor belt, said cutting pins being interdigitated with said screw flight so that said cutting pins move through the spaces between adjacent convolutions of screw flight so that the crushed material is smoothly and continuously moved into said screw conveyor.

2. An apparatus as claimed in claim 1 in which said teeth of said first cutter blade are shaped like the teeth of a comb, and including a second, fixed, cutter blade disposed in said casing on the opposite side of the axis of rotation of said rotary cutter relative to said first fixed cutter blade, said second cutter blade having a multiplicity of transversely spaced-apart teeth on the end thereof adjacent said rotary cutter, said teeth of said second cutter blade being shaped like the teeth of a comb and being interdigitated with said cutting pins of said rotary cutter.

3. An apparatus according to claim 2 in which the upper surfaces of said first and second fixed cutter blades are substantially coplanar with each other and with the upper surface of said upper reach of said conveyor belt.

4. An apparatus as claimed in claim 1 in which said casing is detachably mounted on said enclosure within said vacuum chamber.

5. An apparatus as claimed in claim 4 in which said screw conveyor is detachably mounted on said casing.

6. An apparatus as claimed in claim 1, including a collecting hopper connected for receiving the crushed material discharged from said screw conveyor.

7. An apparatus according to laim 1, claim 2, claim 3, claim 4, claim 5, or claim 6 in which each of said cutting pins is inclined with respect to a line perpendicular to the axis of rotation of said cutter at an angle which is equal to the angle of inclination of said helical screw flight with respect to a line perpendicular to the axis of rotation of said screw conveyor, the pitch of said cutting pins being ¼ of the pitch of said helical screw flight, and an imaginary line connecting the radially outer ends of said cutter pins defines a spiral of the same shape as the spiral edge of said screw flight and in phase therewith.

8. A vacuum drying apparatus, comprising:
an enclosure having an internal vacuum chamber;
a plurality of endless conveyor belts disposed within said vacuum chamber, each of said conveyor belts having a substantially horizontal upper reach, said upper reach having a feed end and a discharge end, each of said conveyor belts having a lower return reach and return portions respectively connecting the opposite ends of said lower return reach to the feed end and discharge end of said upper reach, the upper reaches of said conveyor belts being substantially parallel with and vertically spaced from each other;

supply means for feeding the material to be dried onto the upper surfaces of said upper reach of each of said conveyor belts near to the feed end thereof so that the material moves with said upper reach of said conveyor belt to the discharge end thereof;

heating means associated with said upper reach of each of said conveyor belts for heating the material to assist in drying the material;

a casing mounted adjacent to the discharge end of said upper reach of each of said conveyor belts;

a crushing device disposed within each of said casings, said crushing device comprising a first, fixed, cutter blade extending longitudinally away from said discharge end of said upper reach and adapted for peeling off the material from said upper reach and directing it into said casing, said cutter blade having a multiplicity of transversely spaced-apart teeth on the end thereof remote from said discharge end of said upper reach of said conveyor belt, said crushing device also comprising a rotary cutter mounted for rotation about a substantially horizontal axis extending transversely to said upper reach of said conveyor belt, said rotary cutter comprising a multiplicity of substantially radially extending, axially spaced-apart cutting pins which are interdigitated with said teeth so that rotation of said rotary cutter crushes the material by moving said cutting pins through the interstices between said teeth;

a screw conveyor disposed within each of said casings below said fixed cutter blade and said rotary cutter and adapted for receiving the crushed material, said screw conveyor being rotatable about a substantially horizontal axis that extends transversely to said upper reach of said conveyor belt, said screw conveyor having a helical screw flight for moving the crushed material in a direction transverse to said upper reach of said conveyor belt, said cutting pins being interdigitated with said screw flight so that said cutting pins move through the spaces between adjacent convolutions of screw flight so that the crushed material is smoothly and continuously moved into said screw conveyor.

9. An apparatus as claimed in claim 8 in which said teeth of said first cutter blade are shaped like the teeth of a comb, and including a second, fixed, cutter blade disposed in said casing on the opposite side of the axis of rotation of said rotary cutter relative to said first fixed cutter blade, said second cutter blade having a multiplicity of transversely spaced-apart teeth on the end thereof adjacent said rotary cutter, said teeth of said second cutter blade being shaped like the teeth of a comb and being interdigitated with said cutting pins of said rotary cutter.

10. An apparatus according to claim 9 in which the upper surfaces of said first and second fixed cutter blades are substantially coplanar with each other and with the upper surface of said upper reach of said conveyor belt.

11. An apparatus as claimed in claim 8 in which each of said casings is detachably mounted on said enclosure within said vacuum chamber.

12. An apparatus as claimed in claim 11 in which each of said screw conveyors is detachably mounted on said casing.

13. An apparatus as claimed in claim 8, including a collecting hopper connected for receiving the crushed material discharged from said each of screw conveyors.

14. An apparatus according to claim 8, claim 9, claim 10, claim 11, claim 12, or claim 13 in which each of said cutting pins is inclined with respect to a line perpendicular to the axis of rotation of said cutter at an angle which is equal to the angle of inclination of said helical screw flight with respect to a line perpendicular to the axis of rotation of said screw conveyor, the pitch of said cutting pins being ¼ of the pitch of said helical screw flight, and an imaginary line connecting the radially outer ends of said cutter pins defines a spiral of the same shape as the spiral edge of said screw flight and in phase therewith.

* * * * *